US010684476B2

(12) United States Patent
Smith et al.

(10) Patent No.: US 10,684,476 B2
(45) Date of Patent: Jun. 16, 2020

(54) HEAD-WEARABLE ULTRA-WIDE FIELD OF VIEW DISPLAY DEVICE

(71) Applicant: Lockheed Martin Corporation, Bethesda, MD (US)

(72) Inventors: David A. Smith, Cary, NC (US); Randel A. Crowe, Interlachen, FL (US); Gregory A. Harrison, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 396 days.

(21) Appl. No.: 14/884,975

(22) Filed: Oct. 16, 2015

(65) Prior Publication Data

US 2016/0109710 A1 Apr. 21, 2016

Related U.S. Application Data

(60) Provisional application No. 62/065,328, filed on Oct. 17, 2014.

(51) Int. Cl.
G02B 27/01 (2006.01)
G02B 17/06 (2006.01)

(52) U.S. Cl.
CPC ..... *G02B 27/0172* (2013.01); *G02B 17/0621* (2013.01); *G02B 2027/013* (2013.01); *G02B 2027/0123* (2013.01); *G02B 2027/0132* (2013.01); *G02B 2027/0178* (2013.01)

(58) Field of Classification Search
CPC .............. G02B 27/0101; G02B 27/017; G02B 27/0172; G02B 27/0174; G02B 2027/0123; G02B 2027/013

USPC .................................................. 359/629–633
See application file for complete search history.

(56) References Cited

U.S. PATENT DOCUMENTS

| 3,880,509 | A | 4/1975 | Herndon |
| 4,026,641 | A | 5/1977 | Bosserman et al. |
| 4,176,468 | A | 12/1979 | Marty, Jr. |
| 4,293,196 | A | 10/1981 | Hilbert |
| 4,406,532 | A | 9/1983 | Howlett |

(Continued)

FOREIGN PATENT DOCUMENTS

| CA | 2750287 A1 | 11/2011 |
| CA | 2750287 C | 11/2011 |

(Continued)

OTHER PUBLICATIONS

First Office Action for Chinese Patent Application No. 201180067287.4, dated Feb. 4, 2015, 11 pages.

(Continued)

*Primary Examiner* — Nicholas R. Pasko
(74) *Attorney, Agent, or Firm* — Withrow & Terranova, PLLC

(57) ABSTRACT

Multiple-reflector ultrawide field of view (UWFOV) systems and methods are provided. In one embodiment, a head-wearable display device includes a frame, a narrow-beam light source fixed with respect to the frame, a UWFOV reflective surface fixed with respect to the frame, and a diverging reflective surface fixed with respect to the frame that is configured to receive light emitted from the narrow-beam light source and reflect the light toward the UWFOV reflective surface to spread the light completely across the UWFOV reflective surface.

22 Claims, 6 Drawing Sheets

(56) References Cited

U.S. PATENT DOCUMENTS

| | | | |
|---|---|---|---|
| H000423 H | 2/1988 | Mohon et al. | |
| 5,184,250 A | 2/1993 | Lacroix | |
| 5,253,116 A * | 10/1993 | Lacroix | G09B 9/326 359/471 |
| 5,309,169 A | 5/1994 | Lippert | |
| 5,325,386 A | 6/1994 | Jewell et al. | |
| 5,347,400 A | 9/1994 | Hunter | |
| 5,388,990 A | 2/1995 | Beckman | |
| 5,436,763 A * | 7/1995 | Chen | G02B 5/1876 359/565 |
| 5,561,538 A | 10/1996 | Kato et al. | |
| 5,572,343 A | 11/1996 | Okamura et al. | |
| 5,581,271 A | 12/1996 | Kraemer | |
| 5,641,288 A | 6/1997 | Zaenglein, Jr. | |
| 5,699,194 A | 12/1997 | Takahashi | |
| 5,701,132 A | 12/1997 | Kollin et al. | |
| 5,701,202 A | 12/1997 | Takahashi | |
| 5,712,649 A | 1/1998 | Tosaki | |
| 5,714,967 A | 2/1998 | Okamura et al. | |
| 5,715,094 A | 2/1998 | Ansley et al. | |
| 5,754,344 A | 5/1998 | Fujiyama | |
| 5,757,544 A | 5/1998 | Tabata et al. | |
| 5,774,268 A | 6/1998 | Takahashi | |
| 5,798,738 A | 8/1998 | Yamada | |
| 5,798,739 A | 8/1998 | Teitel | |
| 5,803,738 A | 9/1998 | Latham | |
| 5,834,676 A | 11/1998 | Elliott | |
| 5,844,530 A | 12/1998 | Tosaki | |
| 5,936,663 A | 8/1999 | Tabata et al. | |
| 5,982,343 A | 11/1999 | Iba et al. | |
| 5,999,147 A | 12/1999 | Teitel | |
| 6,038,387 A | 3/2000 | Machida | |
| 6,140,979 A | 10/2000 | Gerhard et al. | |
| 6,140,980 A | 10/2000 | Spitzer et al. | |
| 6,160,666 A | 12/2000 | Rallison et al. | |
| 6,185,045 B1 | 2/2001 | Hanano | |
| 6,201,646 B1 | 3/2001 | Togino et al. | |
| 6,215,593 B1 | 4/2001 | Bruce | |
| 6,266,194 B1 | 7/2001 | Tanijiri et al. | |
| 6,347,869 B1 | 2/2002 | Xu et al. | |
| 6,407,724 B2 * | 6/2002 | Waldern | G02B 5/1885 345/7 |
| 6,445,362 B1 | 9/2002 | Tegreene | |
| 6,504,658 B1 | 1/2003 | Bignolles et al. | |
| 6,522,474 B2 | 2/2003 | Cobb et al. | |
| 6,529,331 B2 | 3/2003 | Massof et al. | |
| 6,549,332 B2 | 4/2003 | Kimura | |
| 6,611,253 B1 | 8/2003 | Cohen | |
| 6,633,304 B2 | 10/2003 | Anabuki et al. | |
| 6,646,811 B2 | 11/2003 | Inoguchi | |
| 6,704,128 B2 | 3/2004 | Takeyama et al. | |
| 6,731,434 B1 | 5/2004 | Hua et al. | |
| 6,751,026 B2 | 6/2004 | Tomono | |
| 6,771,423 B2 | 8/2004 | Geist | |
| 6,788,442 B1 * | 9/2004 | Potin | G02B 27/0172 345/8 |
| 6,795,042 B1 | 9/2004 | Nagata et al. | |
| 6,813,085 B2 | 11/2004 | Richards | |
| 6,829,087 B2 | 12/2004 | Freese et al. | |
| 6,873,471 B2 | 3/2005 | Coates et al. | |
| 6,919,866 B2 | 7/2005 | Kanevsky et al. | |
| 6,919,867 B2 | 7/2005 | Sauer | |
| 6,963,379 B2 | 11/2005 | Tomono | |
| 7,002,551 B2 | 2/2006 | Azuma et al. | |
| 7,009,773 B2 | 3/2006 | Chaoulov et al. | |
| 7,016,116 B2 | 3/2006 | Dolgoff | |
| 7,063,256 B2 | 6/2006 | Anderson et al. | |
| 7,068,444 B2 * | 6/2006 | Nishi | G02B 13/06 345/7 |
| 7,072,096 B2 | 7/2006 | Holman et al. | |
| 7,088,516 B2 * | 8/2006 | Yagi | G02B 27/0172 359/366 |
| 7,095,562 B1 | 8/2006 | Peng et al. | |
| 7,110,013 B2 | 9/2006 | Ebersole et al. | |
| 7,119,965 B1 | 10/2006 | Rolland et al. | |
| 7,151,639 B2 | 12/2006 | Lung | |
| 7,295,377 B2 | 11/2007 | Edelmann | |
| 7,307,791 B2 | 12/2007 | Li et al. | |
| 7,324,081 B2 | 1/2008 | Friedrich et al. | |
| 7,339,742 B2 | 3/2008 | Amitai et al. | |
| 7,385,600 B2 | 6/2008 | Marion | |
| 7,391,573 B2 | 6/2008 | Amitai | |
| 7,407,106 B2 | 8/2008 | Yee et al. | |
| 7,432,879 B2 | 10/2008 | Schonlau | |
| 7,446,941 B2 | 11/2008 | Fukuda | |
| 7,499,217 B2 | 3/2009 | Cakmakci et al. | |
| 7,545,571 B2 | 6/2009 | Garoutte et al. | |
| 7,547,101 B2 | 6/2009 | Fuziak, Jr. | |
| 7,573,525 B2 | 8/2009 | Yamasaki | |
| 7,605,773 B2 | 10/2009 | Janssen | |
| 7,613,356 B2 | 11/2009 | Uchiyama et al. | |
| 7,623,294 B2 | 11/2009 | Harada et al. | |
| 7,626,562 B2 | 12/2009 | Iwasaki | |
| 7,663,793 B1 * | 2/2010 | Doucet | G09B 9/32 359/212.1 |
| 7,732,694 B2 | 6/2010 | Rosenberg | |
| 7,751,122 B2 | 7/2010 | Amitai | |
| 7,765,083 B2 | 7/2010 | Zank et al. | |
| 7,804,507 B2 | 9/2010 | Yang et al. | |
| 7,812,815 B2 | 10/2010 | Banerjee et al. | |
| 7,843,403 B2 | 11/2010 | Spitzer | |
| 7,928,927 B1 | 4/2011 | Krenz et al. | |
| 7,949,295 B2 | 5/2011 | Kumar et al. | |
| 7,965,868 B2 | 6/2011 | Roberts et al. | |
| 8,046,719 B2 | 10/2011 | Skourup et al. | |
| 8,059,342 B2 | 11/2011 | Burke | |
| 8,320,217 B1 | 11/2012 | Barger et al. | |
| 8,625,200 B2 | 1/2014 | Smith et al. | |
| 8,678,282 B1 | 3/2014 | Black et al. | |
| 8,766,879 B2 * | 7/2014 | Fujikawa | G02B 27/0101 345/7 |
| 8,781,794 B2 | 7/2014 | Harrison et al. | |
| 8,884,845 B2 | 11/2014 | Yamazaki et al. | |
| 8,928,558 B2 | 1/2015 | Lewis et al. | |
| 8,964,298 B2 | 2/2015 | Haddick et al. | |
| 9,384,594 B2 | 7/2016 | Maciocci et al. | |
| 9,551,873 B2 | 1/2017 | Zalewski | |
| 2001/0033401 A1 | 10/2001 | Kasai et al. | |
| 2001/0043163 A1 | 11/2001 | Waldern et al. | |
| 2002/0036649 A1 | 3/2002 | Kim et al. | |
| 2002/0047987 A1 | 4/2002 | Massengill et al. | |
| 2002/0094189 A1 | 7/2002 | Navab et al. | |
| 2002/0163486 A1 | 11/2002 | Ronzani et al. | |
| 2002/0181115 A1 | 12/2002 | Massof et al. | |
| 2002/0186179 A1 | 12/2002 | Knowles | |
| 2002/0196554 A1 | 12/2002 | Cobb et al. | |
| 2003/0184868 A1 | 10/2003 | Geist | |
| 2004/0008157 A1 | 1/2004 | Brubaker et al. | |
| 2004/0070839 A1 | 4/2004 | Yagi et al. | |
| 2004/0130783 A1 | 7/2004 | Solomon | |
| 2004/0174599 A1 * | 9/2004 | Dietrich | G02B 27/017 359/489.08 |
| 2005/0046953 A1 | 3/2005 | Repetto et al. | |
| 2006/0072215 A1 | 4/2006 | Nishi | |
| 2006/0103590 A1 | 5/2006 | Divon | |
| 2006/0227067 A1 | 10/2006 | Iwasaki | |
| 2006/0281061 A1 | 12/2006 | Hightower et al. | |
| 2007/0020587 A1 | 1/2007 | Seymore et al. | |
| 2007/0097277 A1 | 5/2007 | Hong et al. | |
| 2007/0132785 A1 | 6/2007 | Ebersole, Jr. et al. | |
| 2007/0177275 A1 | 8/2007 | McGuire, Jr. | |
| 2007/0219760 A1 | 9/2007 | Yang et al. | |
| 2007/0236800 A1 | 10/2007 | Cakmakci et al. | |
| 2007/0242131 A1 | 10/2007 | Sanz-Pastor et al. | |
| 2007/0243916 A1 | 10/2007 | Lee | |
| 2007/0248283 A1 | 10/2007 | Mack et al. | |
| 2007/0273983 A1 | 11/2007 | Hebert | |
| 2008/0007181 A1 | 1/2008 | Pickering | |
| 2008/0063400 A1 | 3/2008 | Hudson et al. | |
| 2008/0071559 A1 | 3/2008 | Arrasvuori | |
| 2008/0123049 A1 | 5/2008 | Volk | |
| 2008/0130309 A1 | 6/2008 | Condon et al. | |
| 2008/0198459 A1 | 8/2008 | Fergason | |

(56) References Cited

U.S. PATENT DOCUMENTS

| | | |
|---|---|---|
| 2008/0204731 A1 | 8/2008 | Williams |
| 2008/0309586 A1 | 12/2008 | Vitale |
| 2009/0002574 A1 | 1/2009 | Sorek et al. |
| 2009/0015735 A1 | 1/2009 | Simmonds |
| 2009/0040308 A1 | 2/2009 | Temovskiy |
| 2009/0112469 A1 | 4/2009 | Lapidot et al. |
| 2009/0122385 A1* | 5/2009 | Hilton ............... G02B 27/0172 |
| | | 359/291 |
| 2009/0153437 A1 | 6/2009 | Aharoni |
| 2009/0173788 A1 | 7/2009 | Moraites et al. |
| 2009/0174589 A1 | 7/2009 | Moraites |
| 2009/0190003 A1 | 7/2009 | Park et al. |
| 2009/0228251 A1 | 9/2009 | Cakmakci et al. |
| 2009/0238378 A1 | 9/2009 | Kikinis et al. |
| 2010/0002154 A1 | 1/2010 | Hua |
| 2010/0018285 A1 | 1/2010 | Murphy et al. |
| 2010/0020643 A1 | 1/2010 | Barger et al. |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1* | 6/2010 | Chaum ............... G02B 27/0093 |
| | | 345/8 |
| 2010/0165430 A1* | 7/2010 | Buschbeck .......... G03H 1/2205 |
| | | 359/9 |
| 2010/0171680 A1 | 7/2010 | Lapidot et al. |
| 2010/0175685 A1 | 7/2010 | Campbell et al. |
| 2010/0214635 A1 | 8/2010 | Sasaki et al. |
| 2010/0238161 A1 | 9/2010 | Varga et al. |
| 2010/0245387 A1 | 9/2010 | Bachelder et al. |
| 2010/0254001 A1 | 10/2010 | Jang |
| 2010/0277575 A1 | 11/2010 | Ismael et al. |
| 2010/0279255 A1 | 11/2010 | Williams, II |
| 2010/0321409 A1 | 12/2010 | Komori et al. |
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0216060 A1 | 9/2011 | Weising et al. |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0228403 A1 | 9/2011 | Masuda et al. |
| 2011/0231757 A1 | 9/2011 | Haddick et al. |
| 2011/0250962 A1 | 10/2011 | Feiner et al. |
| 2011/0283865 A1 | 11/2011 | Collins |
| 2011/0289810 A1 | 12/2011 | D'Souza et al. |
| 2012/0050144 A1 | 3/2012 | Morlock |
| 2012/0068913 A1 | 3/2012 | Bar-Zeev et al. |
| 2012/0120498 A1 | 5/2012 | Harrison et al. |
| 2012/0120499 A1 | 5/2012 | Harrison et al. |
| 2012/0123742 A1 | 5/2012 | Harrison et al. |
| 2012/0154920 A1* | 6/2012 | Harrison ............... G02B 3/0056 |
| | | 359/619 |
| 2012/0204307 A1 | 8/2012 | De Mattei et al. |
| 2012/0212400 A1 | 8/2012 | Border et al. |
| 2012/0242695 A1 | 9/2012 | Martin |
| 2012/0274775 A1 | 11/2012 | Reiffel |
| 2012/0326948 A1 | 12/2012 | Crocco et al. |
| 2013/0016123 A1 | 1/2013 | Skarulis |
| 2013/0021224 A1* | 1/2013 | Fujikawa ............ G02B 27/0101 |
| | | 345/7 |
| 2013/0163090 A1 | 6/2013 | Yu |
| 2014/0002677 A1 | 1/2014 | Schinker |
| 2014/0104274 A1 | 4/2014 | Hilliges et al. |
| 2014/0152531 A1 | 6/2014 | Murray et al. |
| 2014/0182659 A1 | 7/2014 | Davis et al. |
| 2014/0266987 A1 | 9/2014 | Magyari |
| 2015/0103152 A1 | 4/2015 | Qin |
| 2015/0177516 A1 | 6/2015 | Blonde et al. |
| 2015/0178992 A1 | 6/2015 | Bhuruth |
| 2015/0260474 A1 | 9/2015 | Rublowsky et al. |
| 2016/0187969 A1 | 6/2016 | Larsen et al. |

FOREIGN PATENT DOCUMENTS

| | | |
|---|---|---|
| CN | 103261944 A | 8/2013 |
| DE | 102007009828 A1 | 9/2008 |
| EP | 1418458 A1 | 12/2004 |
| EP | 2624238 A1 | 7/2013 |
| GB | 2461907 A | 1/2010 |
| JP | 55-164801 A | 12/1980 |
| JP | 02-032301 A | 2/1990 |
| JP | 05-303054 A | 11/1993 |
| JP | H07134266 A | 5/1995 |
| JP | H07225790 A | 8/1995 |
| JP | H07244246 A | 9/1995 |
| JP | H08190072 A | 7/1996 |
| JP | 08-278476 A | 10/1996 |
| JP | 10-080575 A | 3/1998 |
| JP | 10-206786 A | 8/1998 |
| JP | 2000047138 A | 2/2000 |
| JP | 2002287077 A | 10/2002 |
| JP | 2006039359 A | 2/2006 |
| JP | 2006091477 A | 4/2006 |
| JP | 2008058461 A | 3/2008 |
| JP | 2008529064 A | 7/2008 |
| JP | 2009069364 A | 4/2009 |
| JP | 2009232133 A | 10/2009 |
| JP | 2010019874 A | 1/2010 |
| JP | 2010020065 A | 1/2010 |
| JP | 2010517090 A | 5/2010 |
| JP | 2011133633 A | 7/2011 |
| KR | 10-0292015 B1 | 3/2001 |
| TW | I244318 B | 11/2005 |
| TW | 201326895 A | 7/2013 |
| WO | 9722964 A1 | 6/1997 |
| WO | 2005017729 A2 | 2/2005 |
| WO | 2008051578 A2 | 5/2008 |
| WO | 2009066408 A1 | 5/2009 |
| WO | 2009094643 A2 | 7/2009 |
| WO | 2010047212 A1 | 4/2010 |
| WO | 2010123934 A1 | 10/2010 |
| WO | 2011114149 A1 | 9/2011 |
| WO | 2012052980 A2 | 4/2012 |
| WO | 2012052981 A2 | 4/2012 |
| WO | 2012083042 A1 | 6/2012 |

OTHER PUBLICATIONS

Second Office Action for Chinese Patent Application No. 201180067287.4, dated Oct. 10, 2015, 9 pages.

Examination Report for European Patent Application No. 11806088.8, dated Oct. 27, 2015, 3 pages.

Notification of Reason(s) for Rejection for Japanese Patent Application No. JP 2013-544784, dated Aug. 17, 2015, 9 pages.

Final Office Action for U.S. Appl. No. 13/211,365, dated Jun. 15, 2015, 23 pages.

Notice of Allowance for U.S. Appl. No. 13/211,365, dated Sep. 21, 2015, 7 pages.

Non-Final Office Action for U.S. Appl. No. 13/327,217, dated May 21, 2015, 12 pages.

Final Office Action for U.S. Appl. No. 13/327,217, dated Oct. 8, 2015, 15 pages.

Advisory Action for U.S. Appl. No. 13/327,217, dated Jan. 4, 2016, 3 pages.

(56) References Cited

OTHER PUBLICATIONS

Non-final Office Action for U.S. Appl. No. 13/211,365, dated Feb. 2, 2016, 15 pages.
Unknown, "Optical head-mounted display," Wikipedia, last modified Feb. 25, 2016, en.wikipedia.org/wiki/Optical_head-mounted_display, 18 pages.
Hua, Hong, "Past and future of wearable augmented reality displays and their applications," SPIE Proceedings, vol. 9186, Oct. 20, 2014, SPIE, pp. 91860O-1 to 91860O-12.
Olwal, Alex, et al., "Astor: An Autostereoscopic Optical See-through Augmented Reality System," Proceedings of the Fourth IEEE and ACM International Symposium on Mixed and Augmented Reality, Oct. 5-8, 2005, Vienna, Austria, IEEE, pp. 24-27.
Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.
Examination Report for European Patent Application No. 11815631.4, dated Apr. 13, 2016, 11 pages.
Notice of Allowance and Search Report for Taiwanese Patent Application No. 100148681, dated Mar. 14, 2016, 12 pages.
Third Office Action for Chinese Patent Application No. 201180067287.4, dated Apr. 12, 2016, 10 pages.
Final Office Action for U.S. Appl. No. 13/211,365, dated Jul. 11, 2016, 13 pages.
International Search Report and Written Opinion for PCT/US2015/055918, dated Jan. 27, 2016, 9 pages.
Non-Final Office Action for U.S. Appl. No. 13/327,217, dated Jun. 2, 2016, 18 pages.
Amery, John G., et al., "Flight Simulation Visual Requirements and a New Display System," Cockpit Displays VI: Displays for Defense Applications, Proceedings of the SPIE, vol. 3690, Aug. 16, 1999, 16 pages.
Author Unknown, "ABI Research Anticipates 'Dramatic Growth' for Augmented Reality via Smartphones," Human-Machine Technology Research Service, ABI Research, Oct. 22, 2009, 1 page.
Author Unknown, "VST-2200FL Flight Simulator," Virtual SimTech, 2013, http://www.virtualsimtech.com/flightsimulators.htm, 2 pages.
Author Unknown, "Head Mounted Displays from INITION," Retrieved from http://www.inition.co.uk/3D-Technologies/productsection/31, Accessed on Dec. 30, 2011, 4 pages.
Author Unknown, "Immersive Displays: Powerwall, CAVE, Headmounted Displays (HMD)," InterSense Applications, Downloaded at http://www.intersense.com/categories/11/, Accessed on Mar. 7, 2011, InterSense Incorporated, 3 pages.
Author Unknown, "Lumus—Consumer Market Products," Retrieved from http://www.lumus-optical.com/index.php?option=com_content&task=view&id=9&1temid=15, Accessed on Dec. 30, 2011, Lumus Ltd., 4 pages.
Author Unknown, "SEOS Ultra Wide Field-of-View Head Mounted Display," SEOS HMD 120/40, Product Specifications, Retrieved from http://cgsd.com/SEOSHMD/, Accessed on Oct. 31, 2013, SEOS Displays Ltd., 3 pages.
Author Unknown, "Vuzix High Resolution Video Eyewear: The Future of Big Screen Viewing on the Go!," Vuzix Products, Retrieved from http://www.vuzix.com/consumer, Retrieved Dec. 30, 2011, Vuzix, 2 pages.
Ayras et al., "Near-To-Eye Display Based on Retinal Scanning and a Diffractive Exitpupil Expander," Proceedings of SPIE—The International Society for Optical Engineering, Apr. 12-15, 2010, vol. 7723, No. 77230V, SPIE, 8 pages.
Azuma et al., "Improving Static and Dynamic Registration in an Optical See-through HMD," Computer Graphics: Proceedings of SIGGRAPH 1994, Annual Conference Series, Orlando, Florida, Jul. 24-29, 1994, pp. 197-204.
Bayer et al., "Chapter 3: Introduction to Helmet-Mounted Displays," Excerpt from Helmet-Mounted Displays: Sensation, Perception and Cognition Issues, U.S. Army Medical Department, Medical Research and Material command, USAARL, 2009, 65 pages.

Billinghurst et al., "Collaboration with Tangible Augmented Reality Interfaces," Proceedings of the Ninth International Conference on Human-Computer Interaction, Aug. 2001, vol. 1, 5 pages.
Cakmakci et al., "Meshfree Approximation Methods for Free-Form Surface Representation in Optical Design With Applications to Head-Worn Displays," Proceedings of the SPIE, Aug. 2008, vol. 7061, SPIE, 15 pages.
Cakmakci et al., "Optical Free-Form Surfaces in Off-Axis Head-Worn Display Design," Mixed and Augmented Reality, 7th IEEE/ACM International Symposium, Mar. 2008, pp. 29-32.
Dejong, C. Dean, "Full-Color, See-Through, Daylight-Readable, Goggle-Mounted Display," Proceedings of SPIE—The International Society for Optical Engineering, Apr. 28, 2011, vol. 8041, SPIE, 13 pages.
Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.
Ferscha et al., "Wearable Displays—for Everyone!", Pervasive Computing, Jan. -Mar. 2010, vol. 9, No. 1, Institute of Electrical and Electronics Engineers Inc., pp. 7-10.
Haun, Bzur, "Gartner: Mobility market will reach $1 trillion by 2014," Mobility Management News and Blogs, Visage Mobile, Oct. 21, 2010, 2 pages.
Hastings, A., "Eye Box Performance Parameters for Non Pupil Forming. Head/Helmet Mounted Displays," Tutorial, Opt 521, Dec. 6, 2006, www.optics.arizona.edu/optomech/ . . . /tutorials/HastingsTutorial1.doc, 6 pages.
Henderson, Steve, et al., "Augmented Reality for Maintenance and Repair (ARMAR)," Columbia University, Computer Graphics and User Interfaces Lab, Downloaded at http://graphics.cs.columbia.edu/projects/armar/, Jul. 2007, 4 pages.
Holden, Windsor, "A New Reality for Mobile," Whitepaper, Juniper Research Limited, Feb. 2011, 5 pages.
Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510I/references/mil-hdbk-141/ch7_12.pdf, 20 pages.
Jeon et al., "Mosaicing a Wide Geometric Field of View for Effective Interaction in Augmented Reality," Mixed and Augmented Reality, 6th IEEE and ACM International Symposium, Mar. 2007, pp. 265-266.
Kato et al., "Marker Tracking and HMD Calibration for a Video-based Augmented Reality Conferencing System," Proceedings of the 2nd IEEE and ACM International Workshop on Augmented Reality, Oct. 1999, San Francisco, California, 10 pages.
Kato et al., "Virtual Object Manipulation on a Table-Top AR Environment," 2000, 9 pages.
Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.
Klepper, Sebastian, "Augmented Reality—Display Systems," Technische Universitaet Muenchen, Munich, Germany, Jul. 4, 2007, http://campar.in.tum.de/twiki/pub/Chair/TeachingSs07ArProseminar/1_Display- Systems_Klepper_Report.pdf.
Kurze et al., "Smart Glasses: An Open Environment for AR Apps," 2010 9th IEEE International Symposium on Mixed and Augmented Reality (ISMAR), Science & Technology Papers, Oct. 13-16, 2010, Seoul, South Korea, p. 313.
Lingley et al., "A Single-Pixel Wireless Contact Lens Display," J. Micromech. Microeng., 21 (2011) 125014 (8pp); doi:1 0.1 088/0960-1317/21/12/125014; Nov. 22, 2011, Received Jun. 9, 2011, in final form Sep. 19, 2011.
Liu et al., "An Optical See-Through Head Mounted Display with Addressable Focal Planes," IEEE Int'l Symposium on Mixed and Augmented Reality, Sep. 15-18, 2008, Cambridge, UK.
Livingston et al., "An Augmented Reality System for Military Operations in Urban Terrain," Proc of I/ITSEC '02, Orlando, FL, Dec. 2-5, 2002.
McClernon, Chris et al., "PC-Based Desktop Display versus Immersive Head-Mounted Display Flight Simulator Performance," Interservice/

(56) References Cited

OTHER PUBLICATIONS

Industry Training, Simulation, and Education Conference (I/ITSEC), Dec. 2006, http://www.iitsecdocs.com, 7 pages.

Melzer et al., "Guidelines for HMD Design," in Helmet-Mounted Displays: Sensation, Perception and Cognition Issues, C. E. Rash et al., ed., U.S. Army Aeromedical Research Laboratory, Fort Rucker, AL, 2009, Chapter 17, http://www.usaarl.army.mil/publications/hmd_book09/files/Section%2026%20-%20Chapter17%20Guidelines%20for%20HMD%20design.pdf.

Melzer, James E., "Head-Mounted Displays," The Avionics Handbook, Cary R. Spitzer, ed., CRC Press, Boca Raton Florida, 2001, Chapter 5, http://www.davi.ws/avionics/TheAvionicsHandbook_Cap_5_pdf.

Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.

Mukawa et al., "A Full Color Eyewear Display Using Holographic Planar Waveguides," IDW'08—Proceedings of the 15th International Display Workshops, Dec. 3-5, 2008, vol. 1, pp. 259-262, Inst. of Image Information and Television Engineers.

Mukawa et al., "A Full-Color Eyewear Display Using Planar Waveguides with Reflection Volume Holograms," Journal of the Society for Information Display, vol. 17, No. 3, pp. 185-193, Mar. 2009, Society for Information Display.

Nagahara et al., "Super Wide Viewer Using Catadioptric Optics," Proc. ACM Symposium on Virtual Reality Software and Technology (VRST2003), Oct. 2003, pp. 169-175, Osaka, Japan.

Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, pp. 3738-3743.

Nagahara et al., "Wide Field of View Head Mounted Display for Tele-Presence with an Omnidirectional Image Sensor," Computer Vision and Pattern Recognition Workshop, Jun. 16-22, 2003, vol. 7, 6 pages.

Okuma et al., "An Augmented Reality System Using a Real-Time Vision Based Registration," Proceedings of the Fourteenth International Conference on Pattern Recognition, Aug. 16-20, 1998, p. 1226, vol. 2.

Parviz, Babak A., "Augmented Reality in a Contact Lens," IEEE Spectrum, Sep. 2009, http://spectrum.ieee.org/biomedical/bionics/augmented-reality-in-a-contact-lens/0.

Perey, Christine, et al., "Where's the Money? Mobile AR Revenue Streams," Mobile AR Summit Position Paper, Downloaded at http://www.perey.com/MobileARSummit/Perey-Mobile%20AR-Revenue-Streams.pdf, Feb. 9, 2010, 4 pages.

Pratt, P. D., "Advanced Helmet Sight Reticle Assembly (AHRA)," Jul. 1976, p. 364, Honeywell Inc., Minneapolis Minn. Systems and Research Div.

Rolland et al., "Development of Head-Mounted Projection Displays for Distributed, Collaborative, Augmented Reality Applications," Oct. 2005, Presence, vol. 14, No. 5, pp. 528-549.

Rolland et al., "Invited Paper: Head-Worn Displays—Lens Design," 48th Annual SID Symposium, Seminar, and Exhibition 2010, Display Week 2010, May 23-28, 2010, vol. 2, pp. 855-858, Society for Information Display.

Rose, Melinda, "Microdisplays: Coming Soon to an Eye Near You?", Photonics Spectra, Sep. 2008, vol. 42, No. 9, pp. 68-69, Laurin Publishing Co. Inc.

Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE-Int. Soc. Opt. Eng.

Schwald et al., "An Augmented Reality System for Training and Assistance to Maintenance in the Industrial Context," Journal of WSCG, Feb. 3-7, 2003, vol. 11, No. 1, Plzen, Czech Republic.

Spitzer et al., "Video I/O Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE-Int. Soc. Opt. Eng, USA.

Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.

Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.

Upton et al., "Eyeglass Head-Up Display [Vibrating Fiber Optic Assembly," 1981 SID International Symposium, Digest of Papers, Apr. 28-30, 1981, vol. XII, pp. 48-49, New York, NY, SID, Los Angeles, CA.

Vanden Brook, T., "Device Helps Pinpoint Snipers: Technology is Critical for U.S. Combat Troops," USA Today, Wednesday, Mar. 2, 2011.

Von Waldkirch et al., "Spectacle-Based Design of Wearable See-Through Display for Accommodation-Free Viewing," Proceedings of the Second International Conference on Pervasive Computing, (Lecture Notes in Comput. Sci. 3001 ), Apr. 18-23, 2004, pp. 106-123, Springer-Verlag, Berlin, Germany.

Wang, Robert Y. et al., "Real-time hand-tracking with a color glove," retrieved Dec. 16, 2014 from http://people.csail.mit.edu/rywang/hand/, 3 pages.

Yang et al., "Hybrid Diffractive-Refractive 67 degree-Diagonal Field of View Optical See-Through Head-Mounted Display," Institute of Modern Optics, Aug. 17, 2005, pp. 351-355, vol. 116, No. 7, Optik-Internat, Nankai University, Tianjin, China.

Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.

International Search Report for PCT/IB2011/055824 dated May 16, 2012, 4 pages.

Written Opinion of the International Searching Authority for PCT/IB2011/055824 dated May 2, 2013, 5 pages.

International Preliminary Report on Patentability for PCT/IB2011/055824 dated May 2, 2013, 7 pages.

Examination Report for Australian Patent Application No. 2011319480 dated Oct. 27, 2014, 3 pages.

Examination Report for Australian Patent Application No. 2011319481 dated Oct. 23, 2014, 3 pages.

Examination Report for Australian Patent Application No. 2011343660 dated Oct. 31, 2014, 3 pages.

International Search Report for PCT/IB2011/055820 dated May 21, 2012, 4 pages.

International Search Report and Written Opinion for PCT/US2011/065201 dated Mar. 7, 2012, 14 pages.

International Preliminary Report on Patentability for PCT/US2011/065201 dated Jun. 27, 2013, 11 pages.

International Search Report for PCT/IB2011/055826 dated Sep. 14, 2012, 4 pages.

International Preliminary Report on Patentability for PCT/IB2011/055826 dated May 2, 2013, 11 pages.

First Office Action for Chinese Patent Application No. 201180060659.0, dated Nov. 3, 2014, 10 pages.

First Office Action for Chinese Patent Application No. 201180060662.2, dated Nov. 2, 2014, 13 pages.

Non-final Office Action for U.S. Appl. No. 13/211,365 dated Oct. 24, 2012, 12 pages.

Final Office Action for U.S. Appl. No. 13/211,365 dated Feb. 22, 2013, 15 pages.

Non-final Office Action and Examiner-Initiated Interview Summary for U.S. Appl. No. 13/211,365 dated Jun. 14, 2013, 18 pages.

Final Office Action for U.S. Appl. No. 13/211,365 dated Oct. 18, 2013, 22 pages.

Non-final Office Action for U.S. Appl. No. 13/211,365 dated Apr. 22, 2014, 9 pages.

Notice of Allowance for U.S. Appl. No. 13/211,365, dated Aug. 8, 2014, 7 pages.

(56) References Cited

OTHER PUBLICATIONS

Non-Final Office Action for U.S. Appl. No. 13/211,365, dated Jan. 12, 2015, 20 pages.
Non-final Office Action for U.S. Appl. No. 13/211,372 dated Nov. 21, 2012, 9 pages.
Non-final Office Action for U.S. Appl. No. 13/211,372 dated Mar. 7, 2013, 12 pages.
Final Office Action for U.S. Appl. No. 13/211,372 dated Aug. 1, 2013, 7 pages.
Notice of Allowance for U.S. Appl. No. 13/211,372 dated Sep. 6, 2013, 8 pages.
Non-final Office Action for U.S. Appl. No. 13/211,389 dated Feb. 26, 2013, 21 pages.
Final Office Action for U.S. Appl. No. 13/211,389 dated Jul. 12, 2013, 25 pages.
Notice of Allowance and Applicant-Initiated Interview Summary for U.S. Appl. No. 13/211,389 dated Sep. 19, 2013, 10 pages.
Notice of Allowance for U.S. Appl. No. 13/211,389 dated Jan. 6, 2014, 8 pages.
Non-final Office Action for U.S. Appl. No. 13/327,217 dated Jan. 17, 2014, 14 pages.
Final Office Action for U.S. Appl. No. 13/327,217 dated Jul. 31, 2014, 13 pages.
Advisory Action for U.S. Appl. No. 13/327,217 dated Nov. 5, 2014, 3 pages.
Office Action for Mexican Patent Application No. MX/a/2013/006722, dated Dec. 8, 2014, 7 pages.
Examination Report for European Patent Application No. 11815630.6, dated Nov. 20, 2015, 4 pages.
Notification of Reason(s) for Rejection for Japanese Patent Application No. 2013-534453, dated Dec. 22, 2015, 9 pages.
Patent Examination Report No. 2 for Australian Patent Application No. 2011343660, dated Oct. 22, 2015, 3 pages.
Notice of Acceptance for Australian Patent Application No. 2011319481, dated Oct. 12, 2015, 3 pages.
Second Office Action for Chinese Patent Application No. 201180060659.0, dated Jun. 30, 2015, 6 pages.
Third Office Action for Chinese Patent Application No. 201180060659.0, dated Dec. 15, 2015, 6 pages.
Notification of Reason(s) for Rejection for Japanese Patent Application No. JP 2013-534454, dated Sep. 17, 2015, 7 pages.
Office Action and Search Report for Taiwanese Patent Application No. 100148694, dated Dec. 1, 2015, 18 pages.
Second Office Action for Chinese Patent Application No. 201180060662.2, dated Jun. 10, 2015, 7 pages.
Office Action and Search Report for Taiwanese Patent Application No. 100148681, dated Oct. 5, 2015, 15 pages.
Advisory Action for U.S. Appl. No. 13/211,365, dated Nov. 7, 2016, 3 pages.
Applicant-Initiated Interview Summary for U.S. Appl. No. 13/211,365, dated Nov. 17, 2016, 4 pages.
Notice of Allowance and Applicant-Initiated Interview Summary for U.S. Appl. No. 13/211,365, dated Nov. 23, 2016, 9 pages.
Final Office Action for U.S. Appl. No. 13/327,217, dated Nov. 30, 2016, 24 pages.
Office Action for Mexican Patent Application No. MX/a/2013/004453, dated Oct. 12, 2016, 3 pages.
Notice of Acceptance for Australian Patent Application No. 2015249168, dated Nov. 4, 2016, 2 pages.
Office Action for Mexican Patent Application No. MX/a/2013/004454, dated Oct. 12, 2016, 3 pages.
Decision of Rejection for Chinese Patent Application No. 201180067287.4, dated Oct. 17, 2016, 14 pages.
Debevec, Paul, et al., "A Lighting Reproduction Approach to Live-Action Compositing," Proceedings of the 29th annual conference on Computer graphics and interactive techniques (SIGGRAPH), Jul. 21-26, 2002, San Antonio, Texas, ACM, pp. 1-10.
Waese, Jamie, "SIGGRAPH paper: Infrared Chroma Key," waese.com/infrared-chroma-key/, 2015, Jamie Waese, pp. 1-3.

Decision of Final Rejection for Japanese Patent Application No. 2013-534453, dated Jul. 26, 2016, 5 pages.
Patent Examination Report No. 1 for Australian Patent Application No. 2015249168, dated Jun. 27, 2016, 3 pages.
Notification of Reasons for Rejection for Japanese Patent Application No. 2013-534454, dated Jun. 1, 2016, 13 pages.
Notification of Reasons for Rejection for Japanese Patent Application No. 2013-544784, dated May 31, 2016, 11 pages.
Non-Final Office Action for U.S. Appl. No. 14/501,509, dated Jul. 15, 2016, 7 pages.
International Search Report and Written Opinion for International Patent Application No. PCT/US2016/020444, dated Jun. 14, 2016, 11 pages.
Non-Final Office Action for U.S. Appl. No. 13/303,607, dated Mar. 20, 2014, 23 pages.
Final Office Action for U.S. Appl. No. 13/303,607, dated Oct. 9, 2014, 27 pages.
Non-Final Office Action for U.S. Appl. No. 13/304,780 dated Jan. 30, 2013, 13 pages.
Final Office Action for U.S. Appl. No. 13/304,780, dated Aug. 15, 2013, 16 pages.
Notice of Allowance and Applicant-Initiated Interview Summary for U.S. Appl. No. 13/304,780, dated Nov. 8, 2013, 15 pages.
Second Office Action for Mexican Patent Application No. MX/a/2013/004453, dated Jan. 19, 2017, 6 pages.
Examination Report for European Patent Application No. 11806088.8, dated Dec. 7, 2016, 5 pages.
International Search Report for International Patent Application No. PCT/US2016/057731, dated Dec. 19, 2016, 12 pages.
International Preliminary Report on Patentability for International Patent Application No. PCT/IB2011/055820, dated May 2, 2013, 8 pages.
Decision of Final Rejection for Japanese Patent Application No. 2013-534454, dated Mar. 31, 2017, 11 pages.
Decision of Final Rejection for Japanese Patent Application No. 2013-544784, dated Mar. 31, 2017, 9 pages.
Notice of Allowance for U.S. Appl. No. 13/211,365, dated Mar. 28, 2017, 4 pages.
Non-Final Office Action for U.S. Appl. No. 15/058,739, dated May 23, 2017, 9 pages.
International Preliminary Report on Patentability for International Patent Application No. PCT/US2015/055918, dated Apr. 27, 2017, 6 pages.
Notice of Allowance and Examiner-Initiated Interview Summary for U.S. Appl. No. 13/327,217, dated Mar. 24, 2017, 12 pages.
Final Office Action for U.S. Appl. No. 15/058,739, dated Sep. 13, 2017, 16 pages.
Decision to Grant a Patent for Japanese Patent Application No. 2013-534454, dated Oct. 18, 2017, 6 pages.
Notification of Reexamination for Chinese Patent Application No. 201180067287.4, dated Sep. 5, 2017, 10 pages.
Decision to Grant a Patent for Japanese Patent Application No. 2013-544784, dated Oct. 18, 2017, 6 pages.
International Preliminary Report on Patentability for International Patent Application No. PCT/US2016/020444, dated Sep. 14, 2017, 8 pages.
Non-Final Office Action for U.S. Appl. No. 14/959,444, dated Jul. 3, 2017, 9 pages.
Non-Final Office Action for U.S. Appl. No. 14/858,733, dated Jun. 26, 2017, 11 pages.
Non-Final Office Action for U.S. Appl. No. 15/142,380, dated Jun. 27, 2017, 19 pages.
Notification of Reason for Rejection for Japanese Patent Application No. 2016-229136, dated Oct. 30, 2017, 5 pages.
Office Action for Canadian Patent Application No. 2,815,461, dated Oct. 26, 2017, 4 pages.
Office Action for Canadian Patent Application No. 2,821,401, dated Oct. 17, 2017, 4 pages.
Office Action for Korean Patent Application No. 10-2013-701735, dated Oct. 30, 2017, 10 pages.
Office Action for Canadian Patent Application No. 2,815,452, dated Oct. 31, 2017, 4 pages.

(56) References Cited

OTHER PUBLICATIONS

Office Action for Korean Patent Application No. 10-2013-7013039, dated Dec. 18, 2017, 9 pages.
Examination Report for European Patent Application No. 11815630.6, dated Dec. 13, 2017, 6 pages.
Notice of Allowance for U.S. Appl. No. 15/058,739, dated Nov. 30, 2017, 8 pages.
Corrected Notice of Allowance for U.S. Appl. No. 15/058,739, dated Dec. 7, 2017, 5 pages.
Final Office Action for U.S. Appl. No. 15/142,380, dated Nov. 3, 2017, 27 pages.
Final Office Action for U.S. Appl. No. 14/858,733, dated Dec. 22, 2017, 17 pages.
Final Office Action for U.S. Appl. No. 14/959,444, dated Jan. 16, 2018, 11 pages.
Notice of Allowance for U.S. Appl. No. 15/142,380, dated Feb. 7, 2018, 5 pages.
Non-Final Office Action for U.S. Appl. No. 14/887,800, dated Apr. 4, 2018, 18 pages.
Non-Final Office Action for U.S. Appl. No. 14/858,733, dated Apr. 5, 2018, 23 pages.
Decision of Reexamination for Chinese Patent Application No. 201180067287.4, dated Feb. 11, 2018, 23 pages.
First Office Action for Korean Patent Application No. 10-2013-7013038, dated Mar. 5, 2018, 9 pages.
Preliminary Office Action for Brazilian Patent Application No. 112013009856-2, dated Oct. 15, 2019, 6 pages.
Office Action for Taiwanese Patent Application No. 104134259, dated Jan. 16, 2019, 9 pages.
Quayle Action for U.S. Appl. No. 14/959,444, dated Feb. 5, 2019, 5 pages.
Applicant-Initiated Interview Summary for U.S. Appl. No. 14/858,733, dated Jan. 22, 2019, 6 pages.
Notice of Allowance for U.S. Appl. No. 14/858,733, dated Mar. 4, 2019, 7 pages.
Advisory Action, Examiner-Initiated Interview Summary, and AFCP 2.0 Decision for U.S. Appl. No. 14/887,800, dated Mar. 19, 2019, 5 pages.
Corrected Notice of Allowability for U.S. Appl. No. 14/959,444, dated Oct. 25, 2019, 5 pages.
Corrected Notice of Allowability for U.S. Appl. No. 14/959,444, dated Aug. 13, 2019, 5 pages.
Non-Final Office Action for U.S. Appl. No. 14/887,800, dated Aug. 9, 2019, 23 pages.
Notice of Allowance for U.S. Appl. No. 14/959,444, dated Jul. 3, 2019, 8 pages.
Corrected Notice of Allowability for U.S. Appl. No. 14/858,733, dated Apr. 17, 2019, 5 pages.
Corrected Notice of Allowability for U.S. Appl. No. 14/858,733, dated May 20, 2019, 6 pages.
Extended European Search Report for European Patent Application No. 16858143.7, dated Jul. 3, 2019, 9 pages.

\* cited by examiner

HEAD-WEARABLE ULTRA-WIDE FIELD OF VIEW DISPLAY DEVICE

RELATED APPLICATIONS

This application claims priority to and the benefit of provisional patent application Ser. No. 62/065,328, filed on Oct. 17, 2014, entitled "MULTIPLE-REFLECTOR ULTRA-WIDE FIELD OF VIEW DISPLAY DEVICE," the disclosure of which is hereby incorporated herein by reference in its entirety.

TECHNICAL FIELD

The embodiments relate to head-wearable display devices and, in particular, to head-wearable display devices with multiple reflective surfaces that have an ultra-wide field of view and utilize a narrow-beam light source, such as a Liquid Crystal on Silicon display light source.

BACKGROUND

A Liquid Crystal on Silicon (LCoS) display offers a relatively bright, high-resolution display, and thus would be a desirable source of light for an ultra-wide field of view (UWFOV) reflective surface. However, narrow-beam displays, such as an LCoS display, emit light in a relatively narrow +/−10-degree cone. The narrowness of the beam makes it difficult or impracticable to use an LCoS display in conjunction with a UWFOV reflective surface, such as a 130-degree UWFOV reflective surface. Placing a lens in front of the narrow-beam display may diverge the light, but may not make the light field wide enough to support the parameters of a UWFOV reflective surface. In particular, because the curvature of the UWFOV reflective surface reflects the pixels of the narrow-beam display from particular points on the reflector, the resulting reflector power may be too high, resulting in the light focusing inside of an eye instead of at the fovea of the eye.

SUMMARY

The embodiments relate to head-wearable display devices and, in particular, to head-wearable display devices that have an ultra-wide field of view (UWFOV) and utilize a narrow-beam light source, such as a Liquid Crystal on Silicon (LCoS) display, a digital light processing (DLP) display, or a laser display. In one embodiment, the head-wearable display device includes a frame, a narrow-beam light source fixed with respect to the frame, a UWFOV reflective surface fixed with respect to the frame, and a diverging reflective surface fixed with respect to the frame that is configured to receive light emitted from the narrow-beam light source and reflect the light toward the UWFOV reflective surface to spread the light across the UWFOV reflective surface.

In one embodiment, the narrow-beam light source comprises one of an LCoS display, a DLP display, and a laser display. In one embodiment, the head-wearable display device includes a diverging lens fixed with respect to the narrow-beam light source that is configured to receive the light emitted from the narrow-beam light source and transmit the light toward the diverging reflective surface.

In one embodiment, the UWFOV reflective surface has a field of view (FOV) greater than about 100 degrees. In another embodiment, the UWFOV reflective surface has an FOV greater than about 120 degrees, and in yet another embodiment, the UWFOV reflective surface has an FOV greater than about 140 degrees. In one embodiment, the UWFOV reflective surface is configured to substantially collimate the light. In some embodiments, the UWFOV reflective surface converges the light in order to substantially collimate the light.

In another embodiment, a method for presenting an image to an eye is provided. Light comprising imagery is emitted from a narrow-beam light source. By way of non-limiting example, the imagery may comprise video stream imagery or a static image. A diverging reflective surface reflects the light toward a UWFOV reflective surface. The UWFOV reflective surface reflects the light toward the eye.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The term "about" used herein in conjunction with a numeric value means any value that is within a range of ten percent greater than or ten percent less than the numeric value.

The embodiments relate to head-wearable display devices and, in particular, to head-wearable display devices that have an ultra-wide field of view (UWFOV) and utilize a narrow-beam light source, such as a Liquid Crystal on Silicon (LCoS) display, a digital light processing (DLP) display, and a laser display. The embodiments are particularly applicable to UWFOV reflective surfaces, such as those disclosed in U.S. Pat. Nos. 8,625,200 and 8,781,794, the disclosures of which are incorporated by reference herein. The UWFOV reflective surfaces discussed herein typically, but not necessarily, have a 100-degree or greater field of view (FOV) for each eye of a user and a combined 180-degree FOV for both eyes of the user.

In order to expand a beam of the LCoS or similar microdisplay to fill a wide FOV, the image needs to be expanded and the emitted light needs to be directed into a wider area for reflection from the UWFOV reflective surface. The embodiments may utilize a non-rotationally symmetric, aspherical design due to the rectangular form of a display, and a near-to-the-eye afocal light field.

Figure 1:
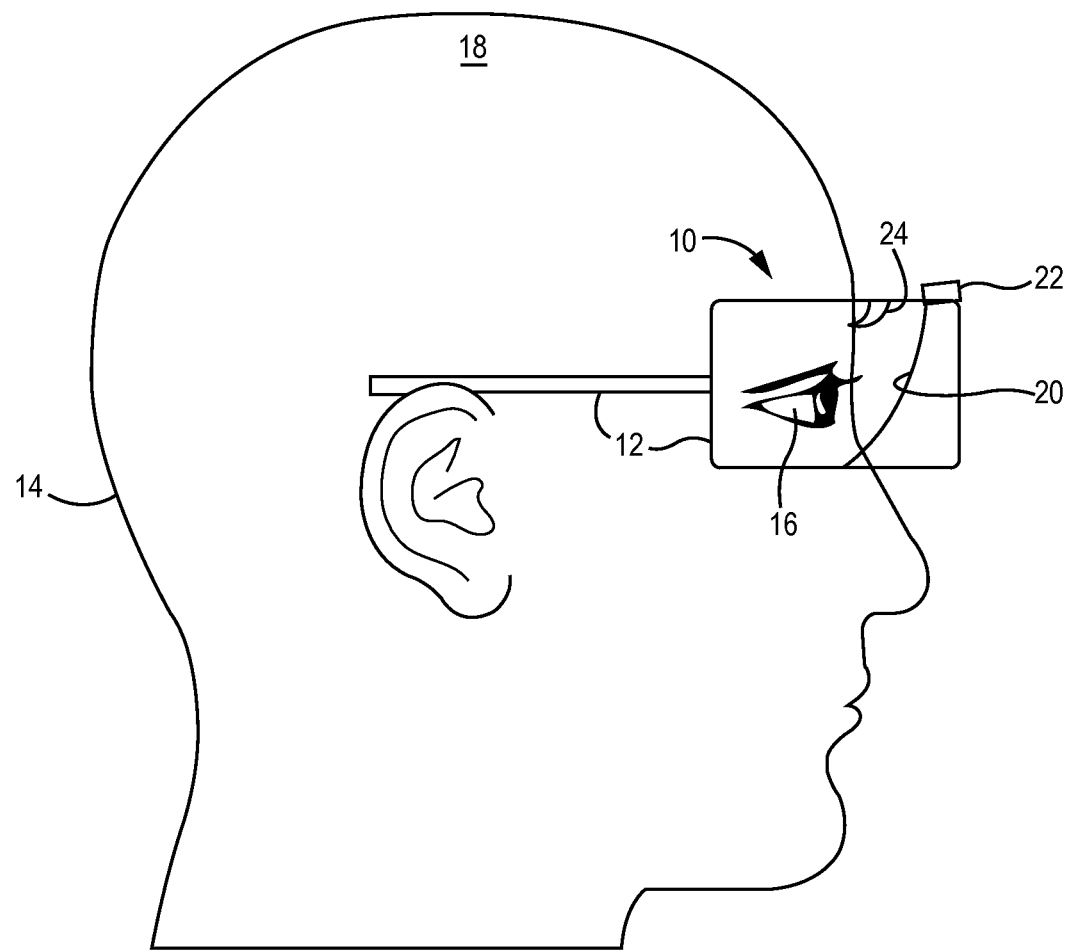
FIG. 1 is a diagram of a head-wearable ultra-wide field of view (UWFOV) display device according to one embodiment.

FIG. 1 is a diagram of a head-wearable UWFOV display device 10 (hereinafter "UWFOV display device 10" for purposes of brevity) according to one embodiment. In this embodiment, the UWFOV display device 10 includes a frame 12 that has a form factor similar to a pair of glasses, and a user 14 wears the UWFOV display device 10 similarly to how the user 14 would wear a pair of glasses. However, the embodiments are not limited to any particular form factor and may comprise any form factor capable of holding the various components with respect to one another, and with respect to eyes 16 (only one illustrated) of the user 14. For example, in one embodiment, the UWFOV display device 10 may be coupled to a head 18 of the user 14 via straps. In another embodiment, the UWFOV display device 10 may be coupled to an apparatus that is worn on the head 18, such as a hat, or a helmet.

A UWFOV reflective surface 20 is fixed with respect to the frame 12. In one embodiment, the UWFOV reflective surface 20 may be substantially similar or identical to the reflective surfaces disclosed in U.S. Pat. Nos. 8,625,200 and/or 8,781,794. The UWFOV reflective surface 20 may, for example, have a 100-degree or greater horizontal FOV for each eye 16 of the user 14; a 120-degree or greater horizontal FOV for each eye 16 of the user 14; or a 135-degree or greater horizontal FOV for each eye 16 of the user 14.

A narrow-beam light source 22 is fixed with respect to the frame 12. The narrow-beam light source 22 may comprise any suitable narrow-beam display or microdisplay, such as, for example, an LCoS display, a DLP display, or a laser display. In one embodiment, the microdisplay has a 4096× 2240 pixel resolution and an area of 18.43 mm by 10.08 mm. The narrow-beam light source 22 may comprise a diagonal dimension of less than one inch, such as, by way of non-limiting example, 0.7 inches, and may emit light in a relatively narrow cone, such as a +/−10-degree cone. In one embodiment, the narrow-beam light source 22 is mapped to the UWFOV reflective surface 20. In particular, the narrow-beam light source 22 comprises a display panel that has a plurality of pixels at a particular resolution, and the pixels are mapped to corresponding locations on the UWFOV reflective surface 20. Each location on the UWFOV reflective surface 20 is configured to reflect and collimate light emitted by the corresponding pixels toward the eye 16 of the user 14. The UWFOV reflective surface 20 is engineered such that light received from pixels of the narrow-beam light source 22 other than the particular corresponding pixels is reflected in a direction other than the eyes 16 of the user 14.

The UWFOV display device 10 includes a diverging reflective surface 24 that is fixed with respect to the frame 12. The diverging reflective surface 24 is configured to receive light emitted from the narrow-beam light source 22 and reflect the light toward the UWFOV reflective surface 20 to spread the light completely across the UWFOV reflective surface 20. The UWFOV reflective surface 20 receives the light from the diverging reflective surface 24 and reflects those light rays that are emitted by the corresponding pixels of the narrow-beam light source 22 toward the eye 16 of the user 14. In some embodiments, the UWFOV reflective surface 20 is configured to substantially collimate the light. While for purposes of illustration only the right eye 16 of the user 14 is shown in FIG. 1, the elements illustrated in FIG. 1 may be duplicated with respect to the left eye 16 of the user 14. Thus, although not illustrated, the UWFOV display device 10 may contain a pair of narrow-beam light sources 22, a pair of diverging reflective surfaces 24, and a pair of UWFOV reflective surfaces 20.

Figure 2:
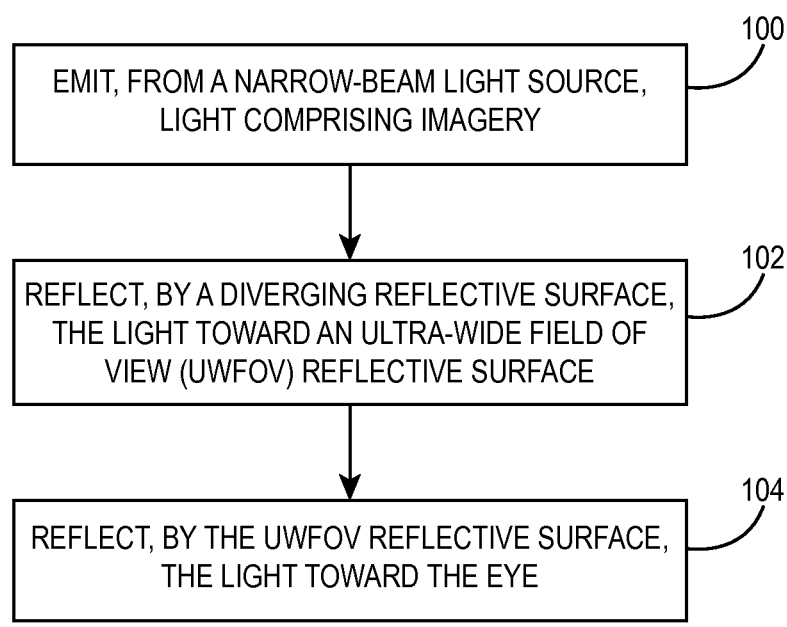
FIG. 2 is a flowchart of a method for presenting an image to an eye according to one embodiment.

FIG. 2 is a flowchart of a method for presenting an image to the eye 16 according to one embodiment. FIG. 2 will be discussed in conjunction with FIG. 1. In this example, assume that the narrow-beam light source 22 emits light that comprises imagery (FIG. 2, block 100). For example, the video may comprise imagery depicting a virtual environment, or the imagery may comprise one or more virtual objects that may be presented to the eye 16 positioned with respect to real-world imagery that the eye 16 concurrently views, such as in an augmented reality embodiment. The diverging reflective surface 24 reflects the light toward the UWFOV reflective surface 20 (FIG. 2, block 102). The UWFOV reflective surface 20 reflects the light toward the eye 16 (FIG. 2, block 104).

The UWFOV reflective surface 20 is a non-rotationally symmetric surface and, in some embodiments, is a concave surface, that is mapped to the narrow-beam light source 22. Such mapping may be implemented as disclosed herein as well as in conjunction, for example, with mechanisms disclosed in U.S. Pat. No. 8,781,794 (hereinafter the '794 Patent). As disclosed in the '794 Patent, non-symmetrical lens surfaces, such as the UWFOV reflective surface 20, can be engineered to, among other advantages, increase an FOV of the user 14, such that imagery presented by the narrow-beam light source 22 can be reflected from a desired surface element or surface elements of the UWFOV reflective surface 20 toward a predetermined location of the eye 16. Such surface elements may overlap one another. In one embodiment, the UWFOV reflective surface 20 comprises a plurality of different surface elements oriented to reflect and collimate light from corresponding regions of the narrow-beam light source 22 toward the predetermined location of the eye 16. The UWFOV reflective surface 20 comprises multiple, such as thousands, of different surface elements that are mapped to corresponding regions of the narrow-beam light source 22.

Figure 3:
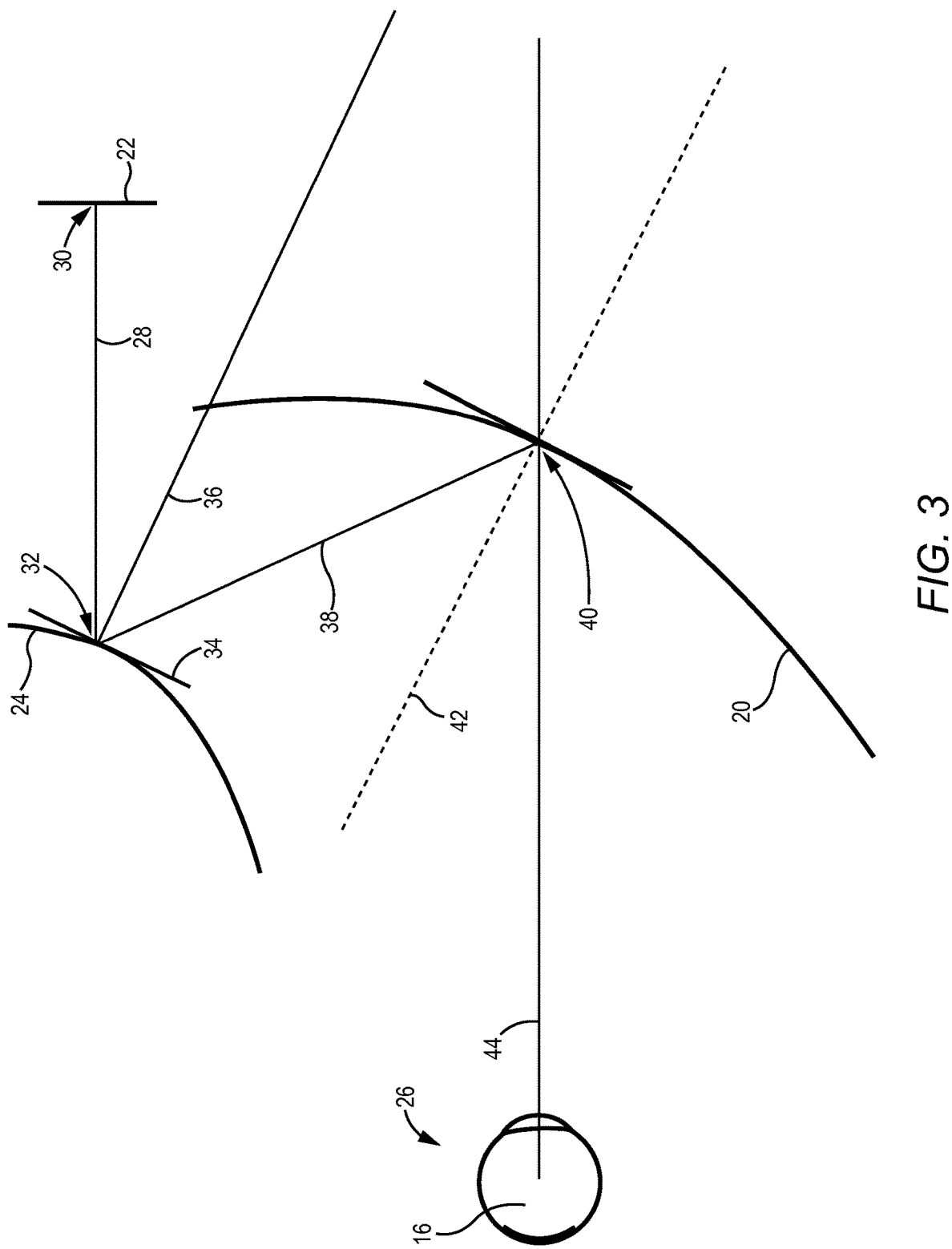
FIG. 3 is a diagram illustrating the mapping of a narrow-beam light source to a diverging reflective surface and a UWFOV reflective surface according to one embodiment.

FIG. 3 is a diagram illustrating the mapping of the narrow-beam light source 22 to the diverging reflective surface 24 and the UWFOV reflective surface 20 according to one embodiment. In particular, surface elements of the narrow-beam light source 22 are mapped to surface elements of the diverging reflective surface 24 and to surface elements of the UWFOV reflective surface 20. With respect to the narrow-beam light source 22, a surface element may comprise a pixel, or a group of pixels. With respect to the diverging reflective surface 24 and the UWFOV reflective surface 20, surface elements correspond to areas of the respective surfaces. The mapping is such that light from a particular surface element of the narrow-beam light source 22 is reflected by a corresponding surface element of the diverging reflective surface 24 to a corresponding surface element of the UWFOV reflective surface 20. The corresponding surface element of the UWFOV reflective surface 20 collimates the light and reflects the light toward a predetermined location 26 of the eye 16. There may be any number of surface elements, and, in some embodiments, there may be thousands or even hundreds of thousands of surface elements mapped among the narrow-beam light source 22, the diverging reflective surface 24, and the UWFOV reflective surface 20, depending on a number of factors, including the resolution of the display of the narrow-beam light source 22. Each of the narrow-beam light source 22, the diverging reflective surface 24, and the UWFOV reflective surface 20 may have the same number of surface elements. An example of the mapping of surface elements among the narrow-beam light source 22, the diverging reflective surface 24, and the UWFOV reflective surface 20 will now be discussed. Assume that surface elements of the narrow-beam light source 22 comprise pixels. Initially, the diverging reflective surface 24 may have a spheroidal shape of a particular radius. A line 28 is positioned between a pixel 30 of the narrow-beam light source 22 and a selected surface element 32 of the diverging reflective surface 24. A tangent 34 of the slope of the selected surface element 32 exists at the selected surface element 32. A three-dimensional (3D) normal 36 of the tangent 34 is adjusted so that the 3D normal 36 bisects the angle formed by the line 28 and a line 38 between the selected surface element 32 and a selected surface element 40 on the UWFOV reflective surface 20. This adjustment identifies a final tangent 34 of the selected surface element 32 of the diverging reflective surface 24, and thus the slope of the selected surface element 32, and thus, the diverging reflective surface 24 may ultimately become non-spheroidal.

Similarly, a 3D normal 42 at the selected surface element 40 is adjusted to bisect the angle formed by the line 38 and a line 44 from the selected surface element 40 to the predetermined location 26 of the eye 16. Once so adjusted, the slope of the selected surface element 40 is determined. This process may be repeated for each surface element of the narrow-beam light source 22 across the entire FOV to define the overall surfaces of the diverging reflective surface 24 and the UWFOV reflective surface 20. The process is iterative and may be repeated hundreds of thousands of times to define the diverging reflective surface 24 and the UWFOV reflective surface 20 with as little error as possible. During the iterations, adjustments may be made to the slopes to minimize the overall error of the system. Each surface element of the UWFOV reflective surface 20 also collimates, or substantially collimates, the light received from the corresponding surface element of the diverging reflective surface 24, and thus also includes the collimation power in the objective for the multi-objective adaptation process that occurs to create the surfaces of the diverging reflective surface 24 and the UWFOV reflective surface 20.

The system produces a point cloud representing the UWFOV reflective surface 20. For example, the point cloud may comprise 500×300 points situated along the UWFOV reflective surface 20 in three dimensions. This point cloud may be imported into a 3D computer-aided design (CAD) system, such as, by way of non-limiting example, Creo. The 3D CAD system may then connect all the points in the point cloud with a non-uniform rational basis spline. The connected points may then be tested in an optics test program, or converted into a physical lens with 3D printing or injection molding.

Figure 4:
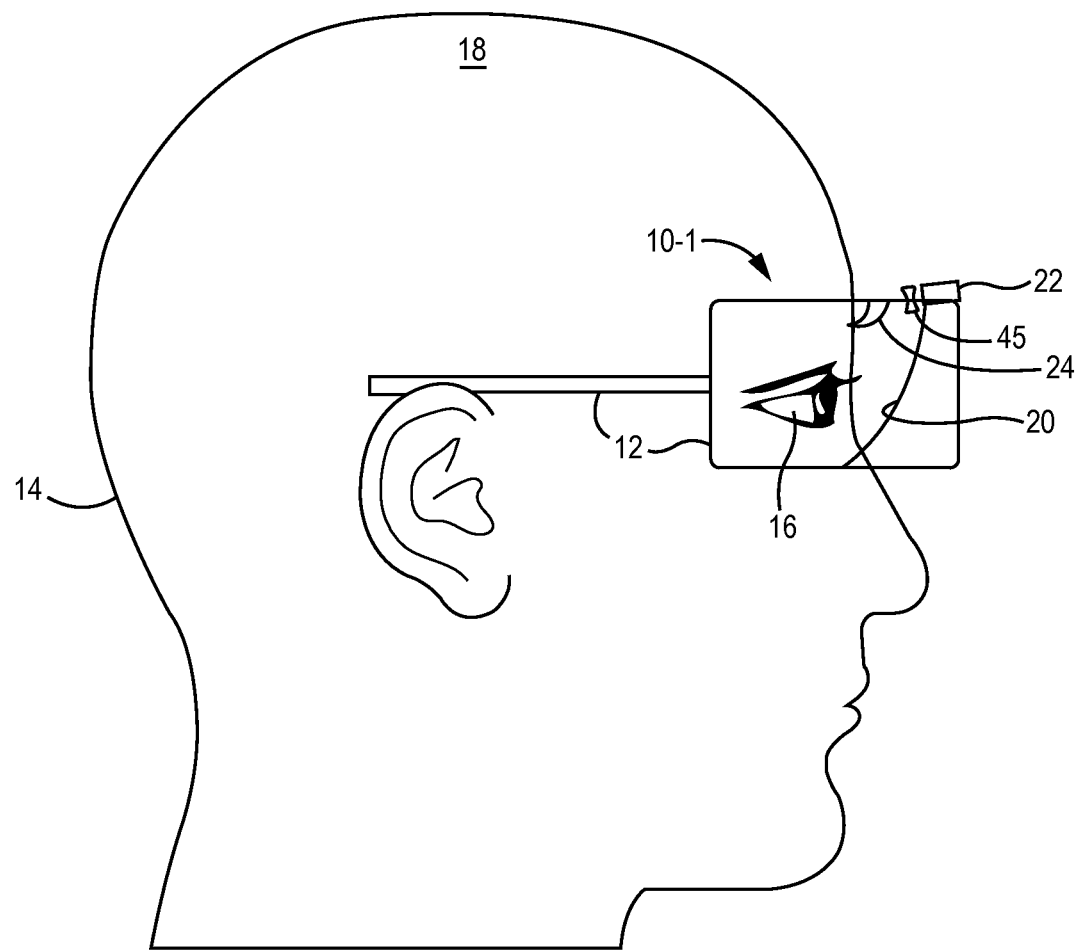
FIG. 4 is a perspective view of a user utilizing the head-wearable UWFOV display device according to another embodiment.

FIG. 4 is a perspective view of the user 14 utilizing a multiple-reflector UWFOV display device 10-1 according to another embodiment. The UWFOV display device 10-1 is substantially similar to the UWFOV display device 10 discussed above except as otherwise discussed herein. The UWFOV display device 10-1 includes a diverging lens 45 that is fixed with respect to the narrow-beam light source 22 and that is configured to receive the light emitted by the narrow-beam light source 22 and transmit the light toward the diverging reflective surface 24. The diverging lens 45 spreads the light across the diverging reflective surface 24. The diverging lens 45 may be fixed to the frame 12, the narrow-beam light source 22, or the diverging reflective surface 24. In some embodiments, the diverging lens 45 is an achromatic lens to help avoid the separation of red, green, and blue components of the light beam.

Figure 5:
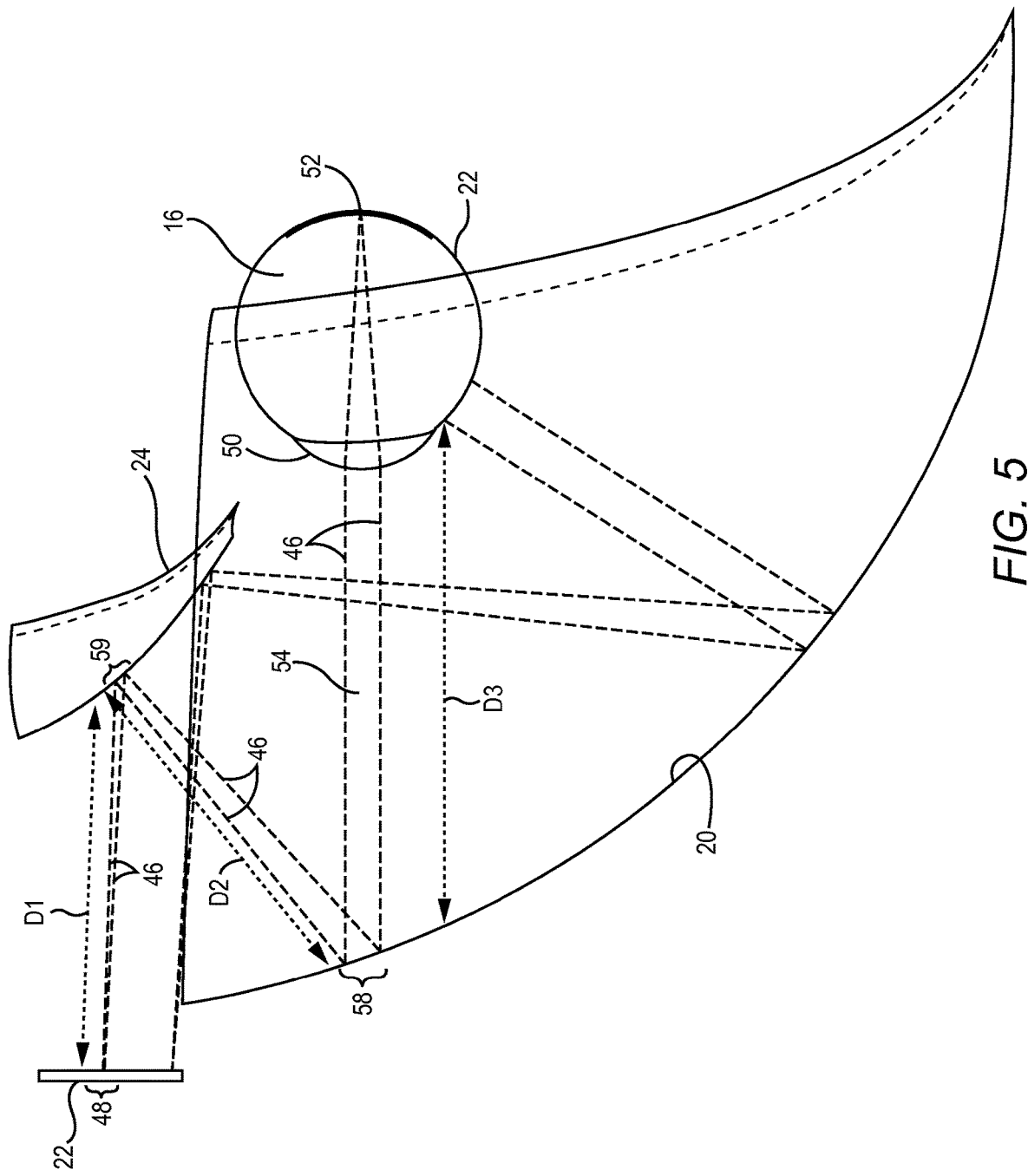
FIG. 5 is a diagram illustrating diverging light rays being reflected into an eye with zero diopters of vergence according to one embodiment.

A set of light beam characteristics defines the focal length of each aspect of the UWFOV display device 10, such that the resulting light to the eye 16 is substantially collimated, thus having zero diopters of vergence, sometimes referred to as 0D. In this regard, FIG. 5 is a diagram illustrating diverging light rays 46 being reflected into an eye 16 with zero diopters of vergence according to one embodiment. The light rays 46 are emitted from a location 48 of the narrow-beam light source 22 and travel in an optical path to enter a pupil 50 of the eye 16 and form a centric 52 at the retina or fovea. The cone defined by the pupil 50 and the centric 52 at the retina or fovea is based on a pencil of light 54 that is reflected from the UWFOV reflective surface 20 after being diverged by the diverging reflective surface 24. The ability to collimate the light rays 46 to the eye 16 is provided in part by the distance D1 between the narrow-beam light source 22 and the diverging reflective surface 24, the distance D2 between the diverging reflective surface 24 and the UWFOV reflective surface 20, and the distance D3 between the UWFOV reflective surface 20 and the eye 16.

Because the UWFOV display device 10 is a near-to-the-eye system and the distance from the narrow-beam light source 22 to the eye 16 is substantially shorter than, for example, distances utilized in a telescope system, the vergence, or diopter, of light emitted from the narrow-beam light source 22 changes rapidly throughout the UWFOV display device 10. As discussed above, in some embodiments, pixels of the narrow-beam light source 22 are mapped to corresponding locations on the UWFOV reflective surface 20, and the locations on the UWFOV reflective surface 20 are configured to reflect and collimate light emitted by the corresponding pixels toward the eye 16.

In this example, assume that light rays 46 are emitted from the location 48 of the narrow-beam light source 22. Further assume that the location 48 is mapped to a location 58 of the UWFOV reflective surface 20 via a location 59 of the diverging reflective surface 24. The vergence is defined as 1/S, where S is expressed in meters. Thus, if the initial distance D1 is 4 cm, the light rays 46 have a vergence of −1/0.04=−25D for the distance D1. The vergence is negative because the light rays 46 are diverging. If, for example, the diverging reflective surface 24 provides a further divergence of −20D by virtue of having a focal length of, for example, 5 cm, and vergence=1/(focal length in meters), then the current vergence of the light rays 46 is −25D+(−20 D)=−45D, since vergence is linearly additive. The light rays 46 are reflected by the diverging reflective surface 24 toward the UWFOV reflective surface 20. The location 58 of the UWFOV reflective surface 20 is configured to collimate the light rays 46 that originate from the location 48 of the narrow-beam light source 22 to bring the vergence of the light rays 46 to 0D, such that collimated light rays 46 are reflected toward the eye 16. If a lens is positioned between the narrow-beam light source 22 and the diverging reflective surface 24, the vergence of the light rays 46 will be further modified.

The UWFOV display device 10 produces a wide FOV by angling the reflecting points along the UWFOV reflective surface 20 to reflect the light from the correct pixels of the narrow-beam light source 22, which introduces a further constraint on the bending of the light rays 46, which is a function of the display width and the expected FOV.

Figure 6:
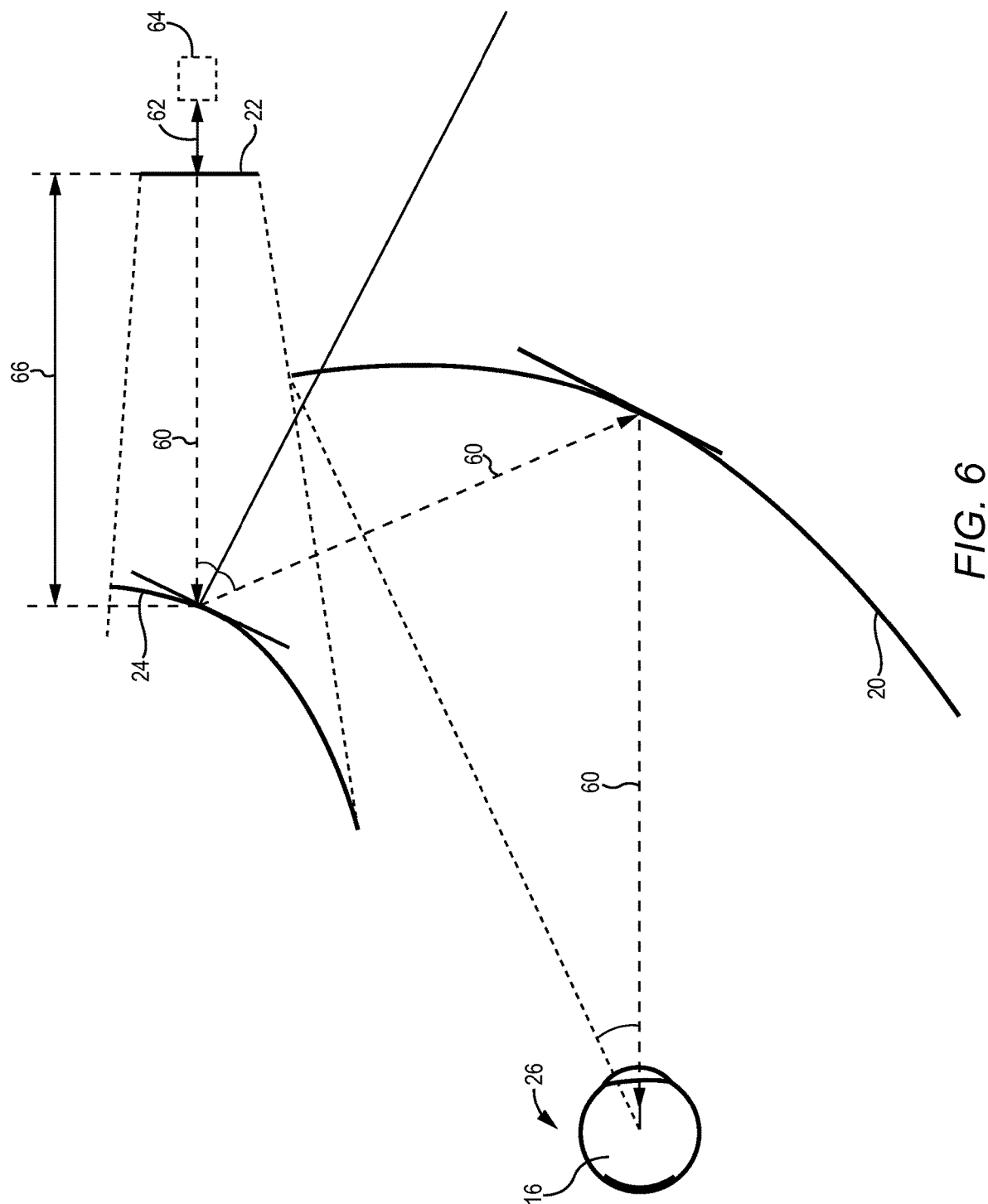
FIG. 6 is a diagram illustrating an example calculation for determining a radius of curvature of a surface element of the UWFOV reflective surface to reflect and collimate light from such surface element toward a predetermined location of an eye according to one embodiment.

As discussed previously, the UWFOV reflective surface 20 not only reflects light emitted from the narrow-beam light source 22 toward the predetermined location 26 of the eye 16 but also collimates, or substantially collimates, the light so that the light can be focused by the user 14. FIG. 6 is a diagram illustrating an example calculation for determining a radius of curvature of a surface element of the UWFOV reflective surface 20 to reflect and collimate light from such surface element toward the predetermined location 26 of the eye 16 according to one embodiment. Assume that a light ray 60 is emitted from the narrow-beam light source 22. Initially, the vergence at the narrow-beam light source 22 is determined. Assume that a half angle of a cone of light emitted from the narrow-beam light source 22 is 11.2 degrees, per specifications of the narrow-beam light source 22. Determine a distance 62 (LClcos) behind the narrow-beam light source 22 where a virtual light source 64 would need to be located to produce a cone of light having a half angle of 11.2 degrees given an aperture of the size of the narrow-beam light source 22, in accordance with the following formula:

$$(LClcos)=(display\_width\_mm/2)/(tan(thetaL2))*0.001; \% \ [m]$$

where display_width_mm is the width of the narrow-beam light source 22, thetaL2 is the half angle of the cone of light (in this example, 11.2 degrees).

The above calculation places the distance 62 (LSlcos) in meters. The distance 62 (LSlcos) may now be converted to a vergence. The vergence is negative since the light is diverging. The vergence (Vlcos) is measured in diopters [D]. The distance 62 LSlcos is the focal length to the virtual light source 64. The vergence (Vlcos) can be determined in accordance with the following formula:

$$Vlcos=-1/(LSlcos): [D]$$

Generally, at a high level, a set of values for the radius of curvature for the diverging reflective surface 24 and the UWFOV reflective surface 20 is cycled through and tested to determine how well the diverging reflective surface 24 and the UWFOV reflective surface 20 reflect the field points (the outer edges of the FOV) into the eye 16, while also collimating the light to the eye 16. The vergence at each surface element of the UWFOV reflective surface 20 should be zero so that reflected light is collimated. The vergence of the light ray 60 arriving at the diverging reflective surface 24 (VatD) is determined in accordance with the following formula:

$$VatD=-(1/(LSlcos+Lld))$$

where LSlcos=the distance 62 and Lld=a distance 66 between the narrow-beam light source 22 and the diverging reflective surface 24.

VatD is negative since the light is diverging. The transfer vergence (Vtld) in the intervening space between the narrow-beam light source 22 and the diverging reflective surface 24 is determined in accordance with the following formula:

$$Vtld=VatD-Vlcos;$$

The vergence power of the diverging reflective surface 24 (Vdcalc) is based upon the radius of curvature (in meters) of the diverging reflective surface 24, selected during the respective multiple iterations through the plurality of possible values for the radius of curvature in accordance with the following formula:

$$Vdcalc=-2/(Rd),$$

where Rd is the radius of curvature of the diverging reflective surface 24.

The vergence of the light leaving the diverging reflective surface 24 (Vcurr) can be determined by summing all the vergences previously determined above in accordance with the following formula:

$$Vcurr=Vlcos+Vtld+Vdcalc.$$

This translates into a distance to the new virtual light source 64 of:

Lcurr=−1/Vcurr: [m]

The vergence at the UWFOV reflective surface 20 (Vatc) can be determined in accordance with the following formula:

Vatc=−1/(Lcurr+ Ldc);

where Ldc is a distance from the diverging reflective surface 24 to the UWFOV reflective surface 20.

In order to collimate the light into the eye 16, the power of the UWFOV reflective surface 20 cancels the vergence (Vatc) arriving at the UWFOV reflective surface 20 mirror. Thus, the radius of curvature (Rc) at this point on the UWFOV reflective surface 20 is:

Rc=−2/Vatc.

Those skilled in the art will recognize improvements and modifications to the preferred embodiments of the disclosure. All such improvements and modifications are considered within the scope of the concepts disclosed herein and the claims that follow.

What is claimed is:

1. A head-wearable display device, comprising:
    a frame;
    a light source fixed with respect to the frame, the light source configured to emit a stationary diverging light beam of light;
    an ultra-wide field of view (UWFOV) reflective surface fixed with respect to the frame; and
    a diverging reflective surface having a negative optical power fixed with respect to the frame that is configured to receive the stationary diverging light beam of light emitted from the light source, to diverge the light to reduce a vergence of the light, and to reflect the light toward the UWFOV reflective surface and spread the light completely across the UWFOV reflective surface, wherein the UWFOV reflective surface is configured to collimate and reflect the light toward a predetermined location.

2. The head-wearable display device of claim 1, wherein the light source comprises one of a Liquid Crystal on Silicon (LCoS) display and a digital light processing (DLP) display.

3. The head-wearable display device of claim 1, wherein the UWFOV reflective surface has a field of view (FOV) greater than about 100 degrees.

4. The head-wearable display device of claim 1, wherein the UWFOV reflective surface has a FOV greater than about 120 degrees.

5. The head-wearable display device of claim 1, wherein the UWFOV reflective surface has a FOV greater than about 140 degrees.

6. The head-wearable display device of claim 1, wherein:
the light source comprises a first plurality of surface elements;
the UWFOV reflective surface comprises a second plurality of surface elements;
the diverging reflective surface comprises a third plurality of surface elements; and
ones of the first plurality of surface elements respectively correspond to ones of the second plurality of surface elements and to ones of the third plurality of surface elements.

7. The head-wearable display device of claim 1, wherein there are no intervening optical elements between the diverging reflective surface and the UWFOV reflective surface.

8. The head-wearable display device of claim 1, wherein the head-wearable display device consists of the frame, the light source, the UWFOV reflective surface, and the diverging reflective surface.

9. The head-wearable display device of claim 1, further comprising a diverging lens fixed with respect to the light source that is configured to receive the light emitted from the light source, diverge the light to reduce the vergence of the light, and transmit the light toward and spread the light across the diverging reflective surface.

10. The head-wearable display device of claim 9, wherein the head-wearable display device consists of the frame, the light source, the diverging lens, the UWFOV reflective surface, and the diverging reflective surface.

11. The head-wearable display device of claim 1, wherein the light source comprises a display panel that has a plurality of pixels at a particular resolution, and the plurality of pixels are mapped to a corresponding plurality of locations on the UWFOV reflective surface.

12. The head-wearable display device of claim 11, wherein the UWFOV reflective surface is configured such that light received from pixels of the light source other than the plurality of pixels mapped to the corresponding plurality of locations is reflected in a direction other than eyes of a user.

13. A method for presenting an image to an eye, comprising:
emitting, from a light source, a stationary light beam of uncollimated light comprising imagery;
receiving, by a diverging reflective surface having a negative optical power, the stationary light beam of uncollimated light;
diverging the uncollimated light, by the diverging reflective surface, to reduce a vergence of the uncollimated light and reflecting the uncollimated light, by the diverging reflective surface, toward an ultra-wide field of view (UWFOV) reflective surface to spread the uncollimated light across a surface of the UWFOV reflective surface; and
collimating, by the UWFOV reflective surface, the uncollimated light to generate collimated light and reflecting the collimated light toward the eye.

14. The method of claim 13, wherein the light source comprises one of a Liquid Crystal on Silicon (LCoS) display and a digital light processing (DLP) display.

15. The method of claim 13, further comprising receiving, by a diverging lens fixed with respect to the light source, the uncollimated light emitted from the light source, diverging the uncollimated light to reduce the vergence of the uncollimated light, and transmitting the uncollimated light toward the diverging reflective surface.

16. The method of claim 13, wherein the UWFOV reflective surface has a field of view (FOV) greater than about 100 degrees.

17. The method of claim 13, wherein the UWFOV reflective surface has a FOV greater than about 120 degrees.

18. The method of claim 13, wherein the UWFOV reflective surface has a FOV greater than about 140 degrees.

19. The method of claim 13, wherein:
the light source comprises a first plurality of surface elements;
the UWFOV reflective surface comprises a second plurality of surface elements;
the diverging reflective surface comprises a third plurality of surface elements; and
ones of the first plurality of surface elements respectively correspond to ones of the second plurality of surface elements and to ones of the third plurality of surface elements.

20. A head-wearable display device, comprising:
a frame;
a light source fixed with respect to the frame, the light source configured to emit a stationary beam of light; and
a light path that begins at the light source and ends at an eye of a user, the light path having only two reflective surfaces and no optical components between the two reflective surfaces, including:
an ultra-wide field of view (UWFOV) reflective surface fixed with respect to the frame; and
a diverging reflective surface having a negative optical power fixed with respect to the frame that is configured to receive the stationary beam of light emitted from the light source, to diverge the light to reduce a vergence of the light, and to reflect the light toward the UWFOV reflective surface to spread the light across the UWFOV reflective surface, wherein the UWFOV reflective surface is configured to collimate and reflect the light toward a predetermined location.

21. The head-wearable display device of claim 20 wherein the light source is selected from a group consisting of a Liquid Crystal on Silicon (LCoS) display and a digital light processing (DLP) display.

22. The head-wearable display device of claim 20, further comprising a diverging lens fixed with respect to the light source that is configured to receive the light emitted from the light source, diverge the light to reduce the vergence of the light, and transmit the light toward the diverging reflective surface.

* * * * *